United States Patent
Mizuno (10) Patent No.: US 10,855,863 B2
(45) Date of Patent: Dec. 1, 2020

(54) IMAGE FORMING APPARATUS TO OBTAIN IMAGE DATA FROM STORAGE

(71) Applicant: CANON KABUSHIKI KAISHA, Tokyo (JP)

(72) Inventor: Yoshitake Mizuno, Fujisawa (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/427,513

(22) Filed: May 31, 2019

(65) Prior Publication Data
US 2019/0379794 A1    Dec. 12, 2019

(30) Foreign Application Priority Data

Jun. 7, 2018    (JP) .................................. 2018-109867

(51) Int. Cl.
| | |
|---|---|
| G06F 3/12 | (2006.01) |
| H04N 1/00 | (2006.01) |
| H04N 1/21 | (2006.01) |
| H04N 1/10 | (2006.01) |

(52) U.S. Cl.
CPC ............. H04N 1/0057 (2013.01); H04N 1/10 (2013.01); H04N 1/21 (2013.01)

(58) Field of Classification Search
None
See application file for complete search history.

(56) References Cited

U.S. PATENT DOCUMENTS

| | | | |
|---|---|---|---|
| 2011/0037990 A1* | 2/2011 | Unno ..................... | G03G 15/50 358/1.5 |
| 2011/0135321 A1* | 6/2011 | Ito ....................... | G03G 15/5062 399/15 |
| 2012/0297242 A1* | 11/2012 | Osada .................. | G06K 15/408 714/6.11 |
| 2013/0148143 A1* | 6/2013 | Ooyanagi .......... | H04N 1/00015 358/1.12 |
| 2015/0131116 A1* | 5/2015 | Sochi ................. | H04N 1/00037 358/1.14 |
| 2018/0007227 A1* | 1/2018 | Komaba .............. | H04N 1/2129 |
| 2019/0212689 A1* | 7/2019 | Matsui ............... | G03G 15/6564 |

FOREIGN PATENT DOCUMENTS

| | | |
|---|---|---|
| JP | 10-13593 A | 1/1998 |
| JP | 10013593 * | 1/1998 |

* cited by examiner

*Primary Examiner* — Henok Shiferaw
(74) *Attorney, Agent, or Firm* — Canon U.S.A., Inc. I.P. Division (57) ABSTRACT

An image forming apparatus includes a storage unit that stores image data, an obtaining unit that obtains the stored image data, a printing unit that prints an image generated from the obtained image data on a sheet, a conveyance unit that conveys a sheet contained in a containing unit to the printing unit and conveys the sheet on which the image has been formed external to the image forming apparatus, and a detection unit that detects that the obtaining unit did not obtain the stored image data, where the conveyance unit stops conveyance of the sheet based on the detection by the detection unit during the conveyance of the sheet.

20 Claims, 10 Drawing Sheets

IMAGE FORMING APPARATUS TO OBTAIN IMAGE DATA FROM STORAGE

BACKGROUND

Field

The present disclosure relates to an image forming apparatus, a control method for the image forming apparatus, and a storage medium.

Description of the Related Art

A multi-functional peripheral is provided with a hard disc drive for storing image data and setting values. In the hard disc drive, an area in which write and read operations are performed can be damaged in a case where a main power supply is interrupted during the write operation or the read operation. A defective area (hereinafter, referred to as a bad sector) where the damage has occurred includes a sector to which data can be written, but from which the data is not to be read.

When a copy function or a print function is to be used, the multi-functional peripheral attempts to write image data to the hard disc drive and read out the written image data to be printed. However, when the image data is written to the bad sector, reading of the image data fails in the bad sector, and printing cannot be properly performed.

According to Japanese Patent Laid-Open No. 10-13593, in a case where the read error occurs when the image data saved in the hard disc drive is read out to be printed, all sheets located inside an image processing apparatus in mid-course for the printing are discharged, and a user is instructed to input the image data of the page where the read error has occurred again.

After the read error of the hard disc drive occurs, when both a page where the reading of the image data has failed due to the error and a page where the printing has been normally performed are output, the page where the image has been normally printed and the page where the read error has occurred could be mixed on a sheet discharge tray. In addition, a user who has checked the sheet discharge tray may think that the printing for all the pages has been normally completed, and collects output products from the sheet discharge tray in some cases. At this time, the page where the printing has been normally completed and the page where the read error has occurred could be mixed in the output products collected by the user.

SUMMARY

According to an aspect of the present application, an image forming apparatus includes a storage unit configured to store image data, an obtaining unit configured to obtain the stored image data, a printing unit configured to print an image generated from the obtained image data on a sheet, a conveyance unit configured to convey a sheet contained in a containing unit to the printing unit and convey the sheet on which the image has been formed external to the image forming apparatus, and a detection unit configured to detect that the obtaining unit did not obtain the stored image data, wherein the conveyance unit stops conveyance of the sheet based on the detection by the detection unit during the conveyance of the sheet.

Further features will become apparent from the following description of exemplary embodiments with reference to the attached drawings.

DESCRIPTION OF THE EMBODIMENTS

First Exemplary Embodiment

Hereinafter, exemplary embodiments will be described with reference to the drawings.

Figure 1:
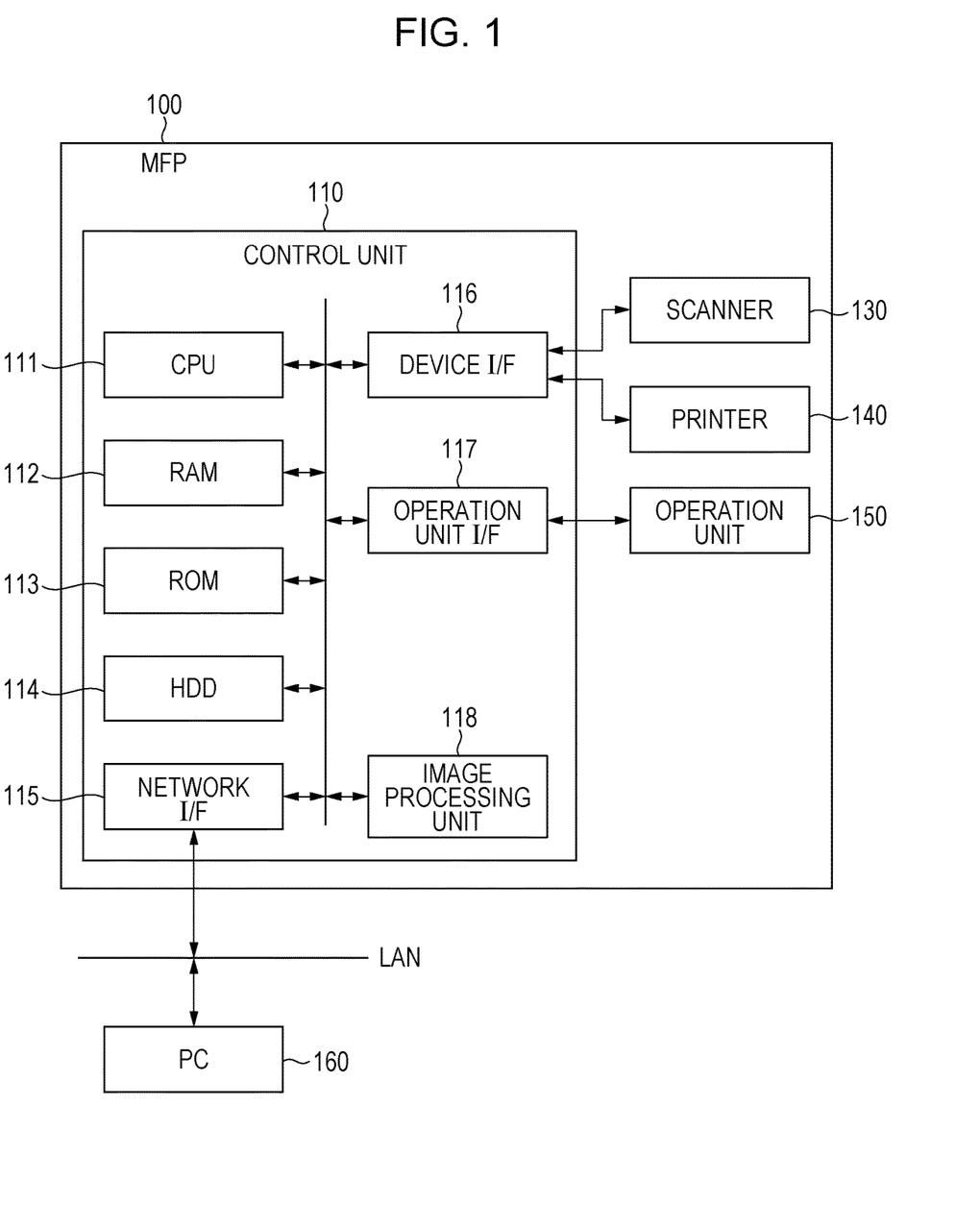
FIG. 1 is a block diagram illustrating an example of a system configuration of an image forming apparatus according to an exemplary embodiment.

FIG. 1 is a block diagram illustrating a configuration example of an image forming apparatus according to an exemplary embodiment. A control unit 110 is connected to a scanner unit 130 functioning as an image input device and a printer unit 140 functioning as an image output device and controls input and output of image information. The control unit 110 is also connected to a local area network (LAN) and receives a print job from an external personal computer (PC) 160 via the LAN.

The control unit 110 includes a central processing unit (CPU) 111 that is configured to control operation of the multi-functional peripheral (MFP) 100. The CPU 111 operates based on a program 300 stored in a read only memory (ROM) 113.

A random access memory (RAM) 112 is a memory configured to temporarily store image data to be processed by an image processing unit 118 and the like. A hard disc drive (HDD) 114 is a storage device that stores, for example, the image data to be printed by the printer unit 140.

In order for the MFP 100 to access the HDD 114, a file system is used with which the image data in the HDD 114 can be dealt with in units of files.

An instruction from an application is accepted by the file system, and a file is opened by specifying a file name with a file path to open the file based on contents of the instruction. Thus, writing of the file and reading of the data in the file can be performed.

The HDD 114 also stores a program for controlling the MFP 100. The program stored in the HDD 114 is loaded into the RAM 112, and the CPU 111 controls the operation of the MFP 100.

A network I/F 115 is connected to the LAN. The network I/F 115 performs a communication with an external apparatus, such as the PC 160, via a network and governs input and output of various information. A device I/F 116 connects the scanner unit 130 and the printer unit 140 functioning as the image input and output devices and the control unit 110 to each other and performs synchronous/asynchronous conversion of the image data.

An operation unit I/F 117 is an interface that connects an operation unit 150 and the control unit 110 and outputs the image data to be displayed on the operation unit 150 to the operation unit 150.

The operation unit I/F 117 also transmits information input by the user from the operation unit 150 to the CPU 111.

The image processing unit 118 performs image processing with respect to print data received via the LAN and image data input from or output to the device I/F 116.

Figure 2:
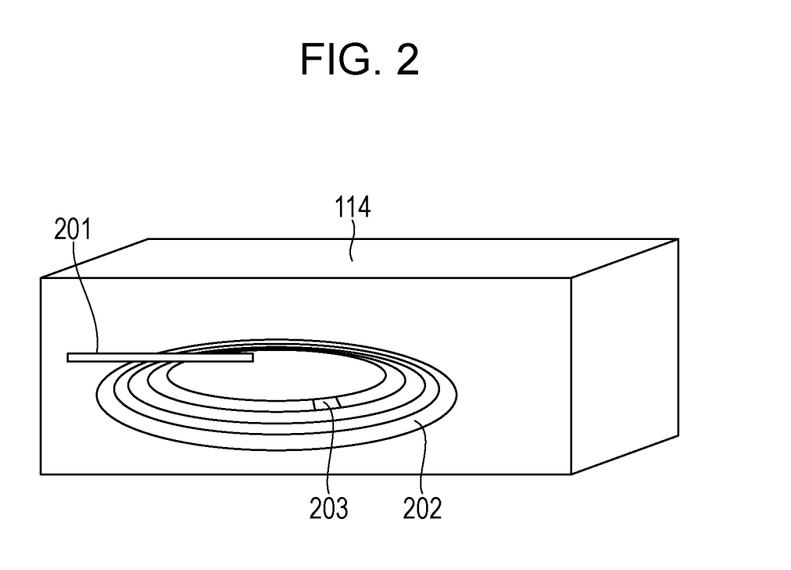
FIG. 2 illustrates an outline of a hard disc drive.

FIG. 2 is an explanatory diagram for describing a schematic configuration of the HDD 114.

The HDD 114 includes a magnetic head 201 and a magnetic disc 202. The HDD 114 rotates the magnetic disc 202 until a sector 203 desired to be read out arrives at a position of the magnetic head 201. The magnetic head 201 then reads out the data written in the sector 203. In a case where the writing to the sector 203 is not normally completed when unintended power supply interruption occurs during the write or read operation, the sector can be damaged, and in some cases become a bad sector. The data written to a bad sector is not to be read out, and an error occurs during the data read.

The HDD 114 can be accessed by using the file system. A PDL management unit (not illustrated) that stores PDL data extracted from a print job data and an image data management unit (not illustrated) that stores raster image data obtained by analyzing the PDL data are arranged in the file system. The CPU 111 accesses the files managed by the PDL management unit of the HDD 114 or the files managed by the image data management unit and reads out the data stored in the respective files.

Figure 3:
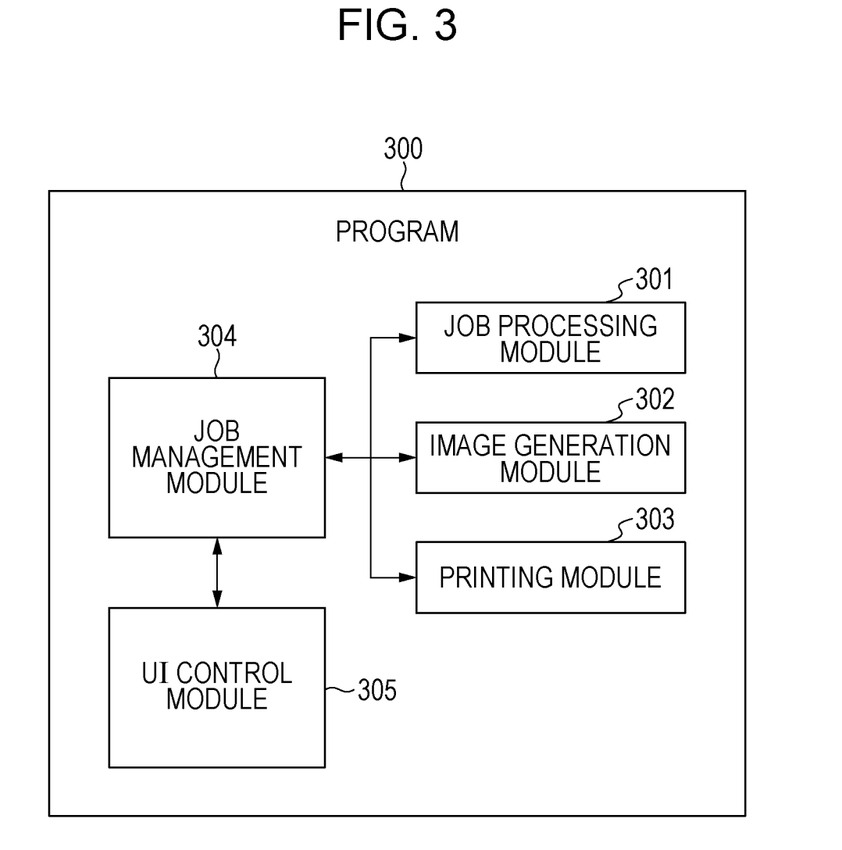
FIG. 3 is a block diagram illustrating an example of a module configuration of a program for controlling an operation of the image forming apparatus according to the exemplary embodiment.

FIG. 3 is a block diagram illustrating a module configuration of a program for controlling the operation of the MFP 100. The modules include a job processing module 301, an image generation module 302, a printing module 303, a job management module 304, and a user interface (UI) control module 305. The job management module 304 instructs the image generation module 302 to convert the PDL data into the printable image data. In addition, the job management module 304 instructs the printing module 303 to start the printing by the printer unit 140 in parallel with the generation of the printing image data by the image generation module 302. The UI control module 305 is a module configured to generate a screen to be displayed on the operation unit of the MFP 100.

Image Forming Apparatus

Figure 4:
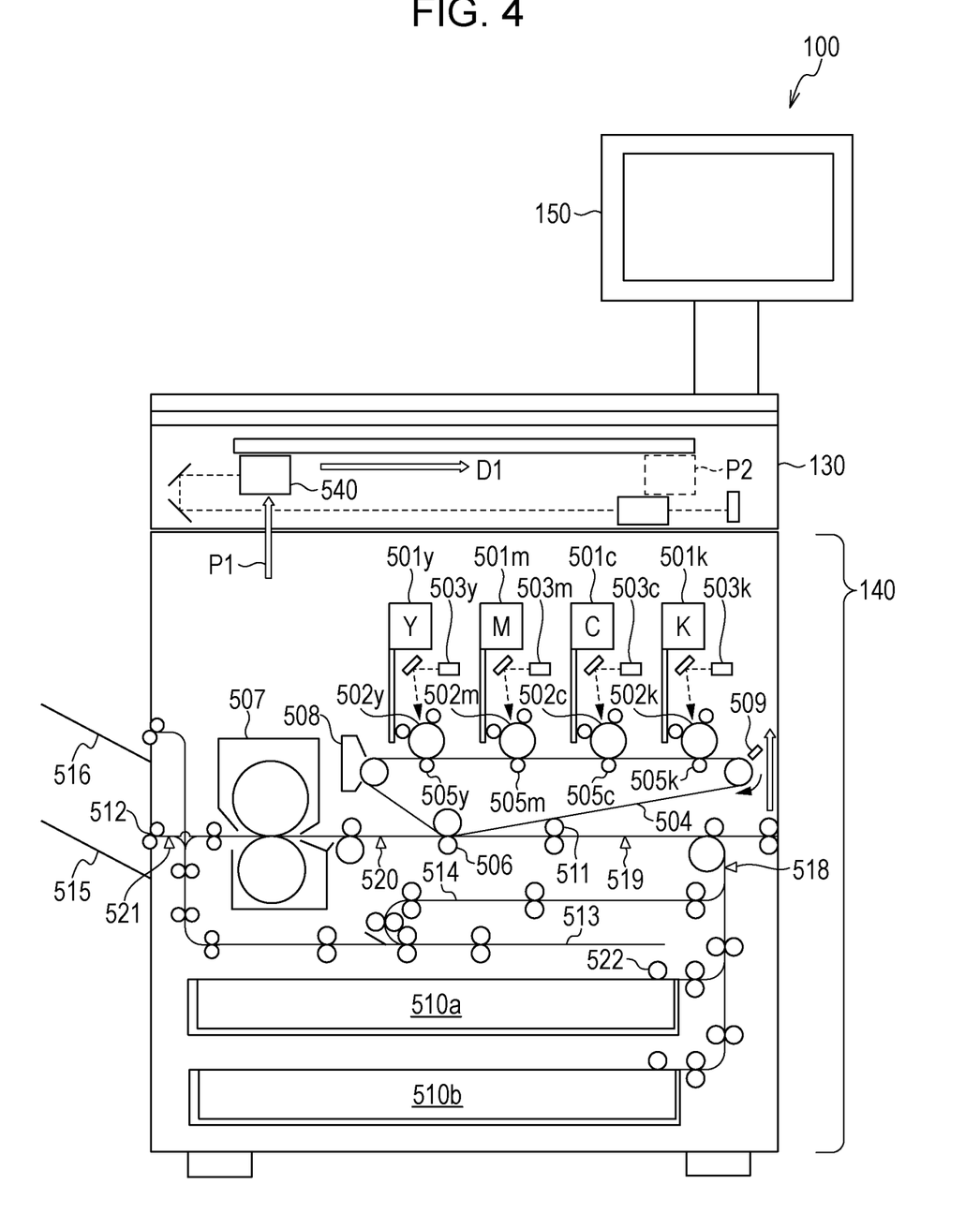
FIG. 4 is a schematic cross sectional view of the image forming apparatus according to the exemplary embodiment.

FIG. 4 is a schematic cross sectional view of the MFP 100. The MFP 100 includes the printer unit 140 and the scanner unit 130. The printer unit 140 is an example of an image forming unit configured to form an image on a sheet. The printer unit 140 can be an engine configured to form a single-color image, but herein, an example of an engine configured to form a multi-color image will be described. The scanner unit 130 functions as a reading unit configured to read an image formed on a sheet. When a duplication of an original is instructed via the operation unit 150, the scanner unit 130 reads the original placed on a platen and generates the image data. A reading unit 540 reads the original while moving from a home position P1 towards a sub scanning direction D1 up to an end position P2.

A plurality of image forming stations 501y, 501m, 501c, and 501k respectively form toner images by using toners of different colors. The image forming station 501y forms an image of yellow. The image forming station 501m forms an image of magenta. The image forming station 501c forms an image of cyan. The image forming station 501k forms an image of black. Herein, y, m, c, and k added to the ends of the reference numerals in the above-described manner represent the colors of the toner, and the letters y, m, c, and k are omitted from the reference numerals when aspects common to all the colors are described. When the image data is received from the scanner unit 130 or the PC 160, the MFP 100 forms an image corresponding to the image data on a sheet.

A photosensitive drum 502 is an image bearing member that rotates in a counterclockwise direction. The photosensitive drum 502 is uniformly charged by a charging unit. An exposure apparatus 503 exposes the photosensitive drum 502 based on the image data. As a result, an electrostatic latent image is formed on the photosensitive drum 502. The electrostatic latent image on the photosensitive drum 502 is developed by a development unit (not illustrated). The development unit contains developing agent including toner and carrier and forms the electrostatic latent image as a toner image by using the toner in the developing agent. In this manner, the photosensitive drum 502 is an image bearing member on which the electrostatic latent image or the toner image are borne.

A toner image of yellow is formed on the photosensitive drum 502y. A toner image of magenta is formed on the photosensitive drum 502m. A toner image of cyan is formed on the photosensitive drum 502c. A toner image of black is formed on the photosensitive drum 502k. Primary transfer units 505y, 505m, 505c, and 505k transfer the respective toner images formed on the photosensitive drums 502y, 502m, 502c, and 502k onto an intermediate transfer belt 504. As a result, the multi-color image is formed on the intermediate transfer belt 504. The intermediate transfer belt 504 functions as an image bearing member on which the image is borne.

Sheet containing units 510a and 510b contain sheets. The sheets contained in the sheet containing units 510a and 510b are fed by a sheet feeding roller 522 to be conveyed to a registration roller 511 along a conveyance path. The registration roller 511 controls a conveyance timing of the sheet such that a timing when the image on the intermediate transfer belt 504 reaches a secondary transfer unit 506 is matched with a timing when the sheet reaches the secondary transfer unit 506. While the image on the intermediate transfer belt 504 and the sheet pass through the secondary transfer unit 506, the toner image on the intermediate transfer belt 504 is transferred to the sheet. After the toner image on the intermediate transfer belt 504 is transferred to the sheet, the toner remaining on the intermediate transfer belt 504 is cleaned by a belt cleaner 508.

The sheet onto which the image has been transferred is conveyed to a fixing unit 507. The fixing unit 507 includes a plurality of rollers and a heater. The fixing unit 507 fixes the toner image on the sheet by applying heat and pressure to the unfixed toner image on the sheet. The sheet on which the image has been fixed by the fixing unit 507 is output from the MFP 100 by a sheet discharge roller 512 and discharged on a sheet discharge tray 515 to be stacked. In a case where the sheets are fully stacked on the sheet discharge tray 515 and the discharge is not to be performed, the sheet is discharged on another sheet discharge tray 516. The sheet discharge trays 515 and 516 are provided with sensors (not illustrated) for determining whether sheets exist on the trays. The MFP 100 determines whether the sheets exist on the sheet discharge trays 515 and 516 by using the above-described sensors.

When execution of a duplex printing mode for forming images on both sides of the sheet is instructed via the operation unit 150, first, a toner image is formed on a first side (front side) of the sheet. The sheet that has passed through the fixing unit 507 is guided to an inversion path 513 by a flapper (not illustrated). The sheet that has been brought into the inversion path 513 where the conveyance direction of the sheet has been inverted is conveyed to a duplex path 514. The sheet that has been conveyed along the duplex path 514 is conveyed to the secondary transfer unit 506 by the registration roller 511 again. The toner image on the intermediate transfer belt 504 is transferred to a second side (back surface) of the sheet conveyed to the secondary transfer unit 506. The fixing unit 507 fixes the toner image on the back side of the sheet. The sheet is discharged on the sheet discharge tray 515 or 516 by the sheet discharge roller 512. As a result, the images are formed on both sides of the sheet.

Sensors 518 to 520 are detection units configured to detect whether the sheet exists on the conveyance path where the sheets fed from the sheet containing units 510*a* and 510*b* are conveyed. The sensor(s) can adopt any method for the detection as long as it is possible to detect whether the sheet exists on the conveyance path. For example, in a case where the sensor(s) comprise a light emitting unit and a light receiving unit and light emitted from the light emitting unit is detected by the light receiving unit, it is determined that the sheet does not exist in the location where the sensor(s) is arranged. In a case where the light emitted from the light emitting unit is not received by the light receiving unit, the sensor(s) determine that the sheet exists on the conveyance path.

A sensor 521 is a sensor configured to detect discharge of the sheet from a sheet discharge port where the sheet is discharged onto the sheet discharge tray 515 or 516. The sensor 521 detects discharge of a rear end of the sheet. The printing module 303 detects that the rear end of the sheet is discharged by using the sensor 521 and notifies the job processing module 301 that the printing for one page is completed after the discharge of the sheet.

Conveyance Path of Sheet

Figure 5:
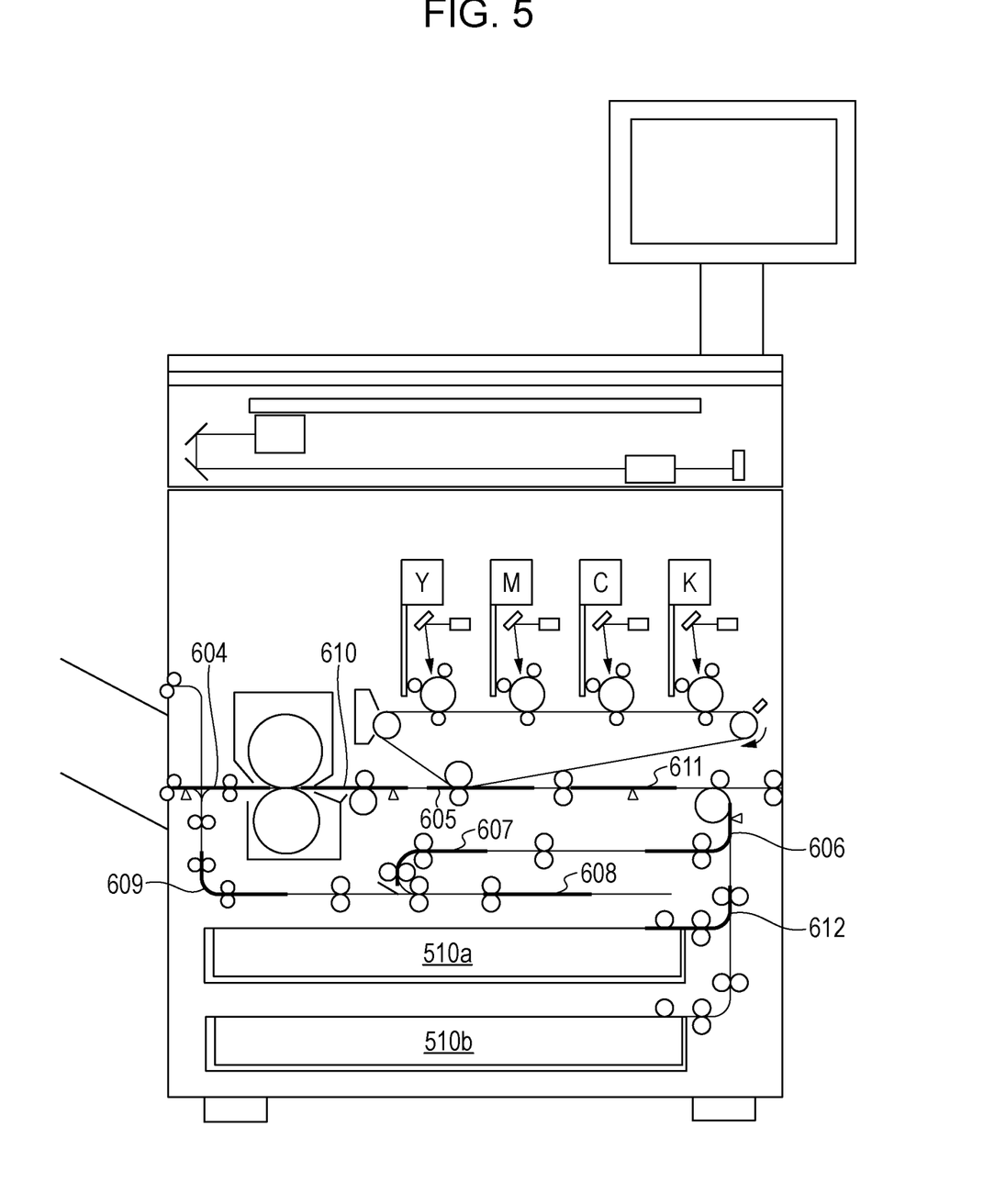
FIG. 5 illustrates a sheet conveyance path of the image forming apparatus according to the exemplary embodiment.

FIG. 5 is a cross sectional view for describing a sheet conveyance path of the MFP 100 according to the present exemplary embodiment. A flow of the sheet that is fed from the sheet containing unit 510*a* on which the image is formed to be discharged on the sheet discharge tray 515 will be described by using locations 604 to 612. Hereinafter, a side of the sheet on which the image is printed earlier when duplex printing is to be executed will be referred to as the first side, and a side of the sheet on which the image is printed later will be referred to as the second side.

The sheet fed from the sheet containing unit 510*a* is subjected to the image formation and discharged on the sheet discharge tray 515 or 516 in the following order. First, the sheet is fed from the sheet containing unit 510. The conveyance of the sheet contained in the sheet containing unit 510 is started from location 612. Thereafter, the sheet is conveyed to location 611. The sheet is conveyed from location 611 to location 605, and the image is transferred thereon. Then, the sheet is conveyed to location 610 and passes through the fixing unit. The image is fixed on the sheet in location 610. In the above-described process, the printing on the one side of the sheet is completed. In a case where single-sided printing is instructed, the sheet is discharged on the sheet discharge tray 515 as it is.

In a case where the printing is subsequently performed on the back side, the sheet is conveyed to location 609. The sheet is conveyed from location 609 to location 608 where the conveyance direction is inverted and moves to location 607. Thereafter, the sheet moves to location 606 to be conveyed to location 611 again. Thereafter, the image is transferred and fixed on the back side of the sheet, and the sheet is discharged external to the MFP 100. Locations 606 to 609 correspond to an inverse path where the printing side of the sheet is to be inverted.

After the printing is started, the MFP 100 feeds the next sheet from the sheet containing unit, e.g., 510*a*, 510*b*, before the discharge of the one sheet is completed and starts the printing for the next image. For this reason, in a case where a print job comprises images for a plurality of pages is executed or a plurality of print jobs are continuously executed, the plurality of sheets are conveyed to the conveyance path of the MFP 100.

According to the present exemplary embodiment, in a case where the read error is detected when the image data to be printed on the first side is read out from the HDD 114, for example, the sheet can be located in a location on the conveyance path before the image is transferred, such as location 612. In a case where the read error of the image data to be printed on the second side from the HDD 114 is detected, the sheet can be located in a location on the inverse path after the fixing of the image on the first side is completed before the transfer of the image on the second side is started such as, for example, location 608, 607, or 606.

In a case where the read error is detected when the image data is read out from the HDD 114, the MFP 100 stops the conveyance of the sheet. When the above-described configuration is adopted, it is possible to avoid a situation where the sheet on which the printing has not been correctly performed due to the failure in reading of the image data from the HDD 114 is discharged external to the MFP 100.

Figure 6:
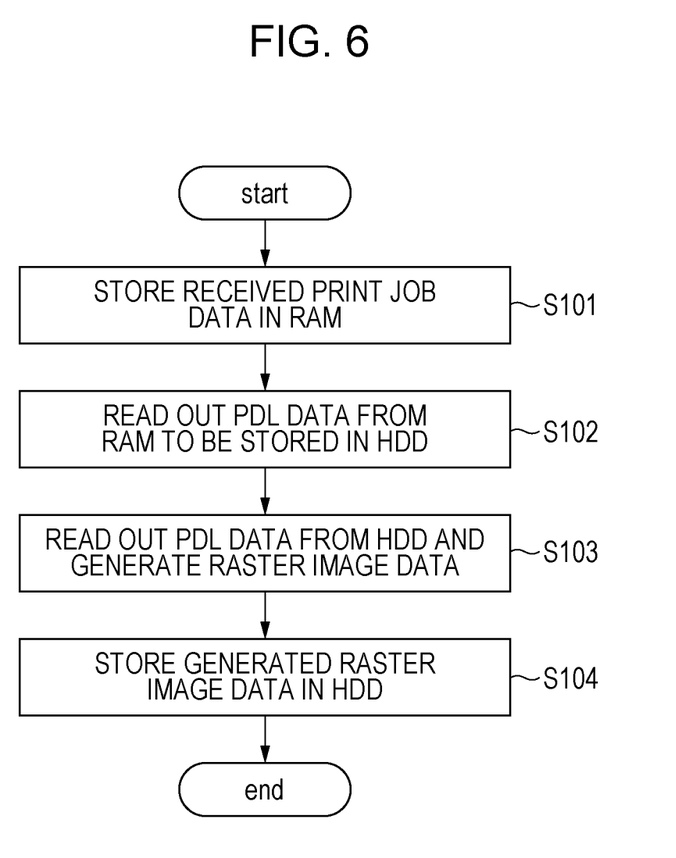
FIG. 6 is a flow chart for describing processing executed when a print job of the image forming apparatus according to the exemplary embodiment is received.

FIG. 6 is a flow chart illustrating processing executed when the image forming apparatus according to the present exemplary embodiment receives the print job. The processing described in the present flow chart is started when the MFP 100 receives the print job from an external apparatus such as the PC 160. A program for executing the respective processes in the present flow chart is stored in the ROM 113. When the processes illustrated in the following respective blocks are executed by respective software blocks illustrated in FIG. 3, the processing described in FIG. 6 is realized.

In S101, when the print job data 700 transmitted from the PC 160 is received by the network I/F 115, the job management module 304 saves the received print job data in the RAM 112. The print job data stored in the RAM 112 includes a header part indicating a setting value, such as the number of copies of the print job and a data part indicating data to be printed. PDL data generated by a printer driver of the PC 160 is stored in the data part of the print job data.

In S102, the job management module 304 controls the job processing module 301 and extracts the PDL data from the print job data stored in the RAM 112 in S101 to be stored in the HDD 114. According to the present exemplary embodiment, the PDL data for one page is stored in the HDD 114 as one file. The PDL data for one page can also be separately stored in a plurality of files.

In S103, the job management module 304 controls the image generation module 302 and starts reading of the PDL data stored in the HDD 114. In S103, the job processing module 301 issues a notification to the job management module 304 based on the completion of the storage of the image data for one page in the HDD 114. Then, the job management module 304 that has received the notification from the job processing module 301 instructs the image generation module 302 to generate the raster image data. The image generation module 302 receives the notification from the job management module 304 and accesses the file stored in the file managed by the PDL management unit of the HDD 114 to start reading of the PDL data. The image generation module 302 then generates the raster image data from the PDL data obtained from the HDD 114.

In S104, the job management module 304 controls the image generation module 302 and stores the generated raster image data in a folder managed by the image data management unit of the HDD 114. Then, the image generation module 302 notifies the job management module 304 of a path of the file where the generated raster image data is stored. The job management module 304 stores the file path notified from the image generation module and the respective pages in the RAM 112 while being associated with each another.

After the above-described processes are executed, the job management module 304 ends the processing described in FIG. 6. When the print job is received, the processing described in FIG. 6 is executed as needed.

Figure 7:
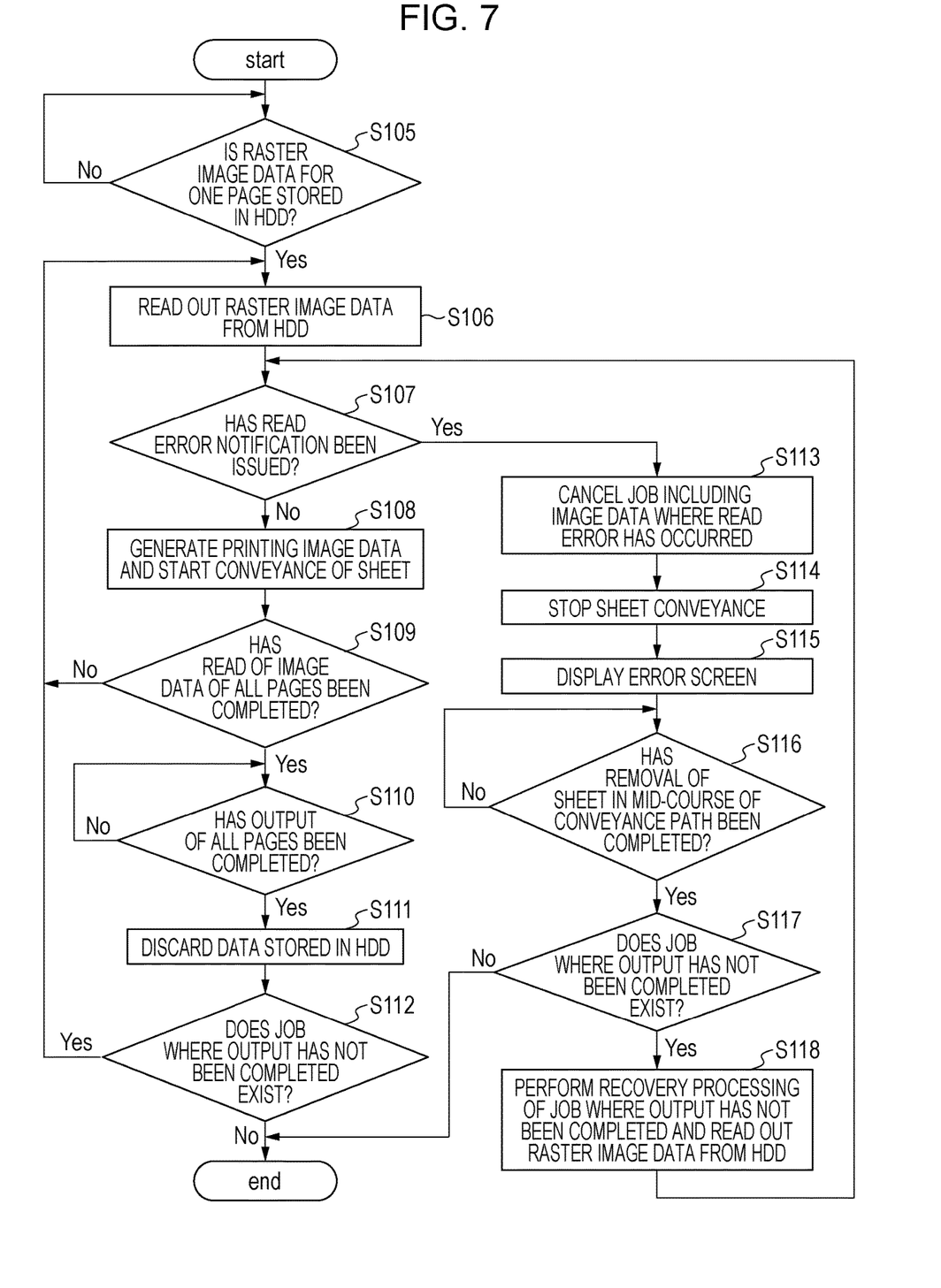
FIG. 7 is a flow chart for describing a flow of printing processing of the image forming apparatus according to a first exemplary embodiment.

FIG. 7 is a flow chart illustrating processing for printing the raster image data stored in the HDD 114. A program for executing the respective processes in the present flow chart is stored in the ROM 113. When the processes illustrated in the following respective blocks are executed by respective software blocks illustrated in FIG. 3, the processing described in FIG. 7 is realized.

In S105, the job management module 304 determines whether the raster image data for one page is stored in the HDD 114. In a case where the image data of the raster image data for one page is not stored in the HDD 114, the job management module 304 continuously executes the processing described in S105 and waits until the raster image data for one page is stored the HDD 114. In a case where the image data of the raster image data for one page is stored in the HDD 114, the job management module 304 advances the processing to S106. According to the present exemplary embodiment, it is determined in S105 whether the raster image data for one page is stored. The number of pages of the raster image data in the HDD 114 is not limited to one.

In S106, the job management module 304 controls the printing module 303 to start the conveyance of the sheet. The job management module 304 controls the image generation module 302 to start reading of the raster image data from the file managed by the image data management unit of the HDD 114. In S106, the job management module 304 notifies the printing module to start the conveyance of the sheet from the sheet containing unit. The printing module 303 controls the printer unit and drives the sheet feeding roller and the respective rollers in the MFP 100 to start the conveyance of the sheet. The job management module 304 notifies the image generation module 302 to start the printing image generation. The image generation module 302 starts reading of the raster image data from the HDD 114 based on the notification. The image generation module 302 uses the file system to access the file that stores the raster image data desired to be read out by the HDD 114.

According to the present exemplary embodiment, in S106, the job management module 304 instructs both the start of the conveyance of the sheet and the start of reading of the raster image data. The start instruction of the conveyance of the sheet and the reading of the raster image data can be implemented in an asynchronous manner as mutually independent processes. For example, while the raster image data is typically read out in S106, the job management module 304 can also start the conveyance of the sheet on which the image of the raster image data is to be printed before the reading of the raster image data in S106.

In S107, the job management module 304 determines whether the notification of the read error from the HDD 114 is performed via the image generation module 302. In S106, the image generation module 302 transmits a read request to the HDD 114 with respect to the file that stores the image data desired to be read out. The image generation module 302 obtains the raster image data stored in the file as a response to the read request. In a case where the raster image data stored in the file specified by using the file system is not to be obtained, the HDD 114 issues a notification of an error as a response to the read request. The image generation module 302 notifies the job management module 304 of the error that has been notified from the file system. In a case where the notification of the read error is performed in S107, the job management module 304 advances the processing to S113. In a case where the notification of the read error is not performed in S107, the job management module 304 advances the processing to S108. When the error notification is performed in S107, the job management module 304 detects that reading of the raster image data is not performed during the sheet conveyance.

In S108, the job management module 304 controls the image generation module 302 to generate the printing image data. In S108, the image generation module 302 converts RGB signal values of the respective pixels into CMYK signal values or executes dither processing to generate the printing image data.

In S108, when the conveyance of the sheet on the first page for the print job is to be started, the printing module 303 sets setting values used for the execution of the print job and executes temperature adjustment processing for the fixing unit and the like in addition to the conveyance of the sheet. For example, the printing module 303 sets the value of the counter for counting the number of pages where the printing has been already performed as 0. The counter is stored in the RAM 112. Thereafter, each time the sensor 521 arranged in the sheet discharge port to the sheet discharge tray detects the discharge of the sheet, the printing module 303 increments a value of a counter of the RAM 112 by one. The printing module 303 can determine up to which page the printing has been completed by referring to the counter.

In S109, the job management module 304 controls the job processing module 301 and determines whether reading of the image data for all the pages is completed. In a case where reading of the image data for all the pages is not completed, the job management module 304 returns the processing to S106 and continuously executes the processing.

In a case where reading of the image data for all the pages is completed, the job management module executes the processing described in S110.

In S110, the job management module 304 controls the printing module 303 and determines whether the output of all the pages of the currently executed job is completed. In S110, the printing module 303 refers to the value of the counter for managing the number of already printed pages stored in the RAM 112. In a case where it is determined that the page where the printing is not completed exists, the job management module 304 continuously performs the processing described in S110. In a case where the output for all the pages is completed, in S111, the job management module 304 controls the job processing module 301 to discard the PDL data and the raster image data of the print job stored in the HDD 114. Thereafter, the job processing module 301 advances the processing to S112.

In S112, the job management module 304 controls the job processing module 301 and determines whether the print job in which the output to the HDD 114 is not completed is stored in the HDD 114. In S112, in a case where the print job in which the output is not completed is stored in the HDD 114, the job management module 304 returns the processing to S106. That is, the raster image data of the other print job is read out from the HDD 114 to start the printing. In S112, in a case where the print job in which the printing is not completed is not stored in the HDD 114, the job management module 304 completes the processing described in the present flow.

In S113, the job management module 304 cancels the execution of the print job including the page where the read error has occurred. In S113, the job management module 304 controls the image generation module 302 to stop the generation processing of the raster image data and the printing image data and performs the control such that the sheets on which the images for the page where reading has failed and the subsequent pages are printed are not to be output. At this time, the printing module 303 stops feeding the sheet from the sheet feeding unit. The job management module 304 controls the job processing module 301 to delete the PDL data and the raster image data of the job stored in the HDD 114. When the PDL data and the raster image data are deleted from the HDD 114, for example, the job processing module 301 can also use a delete command of an operating system (OS). In S113, since the job processing module 301 releases a space where the PDL data and the raster image data are stored from the HDD 114, the PDL data and the raster image data extracted from the other print job can be stored in the above-described space. In addition, in S113, the job management module 304 can change a status of the job to be stored in the RAM 112 from the currently executed state to the stopped state. In a case where the above-described configuration is adopted, for example, when a history list of the executed jobs is displayed on the operation unit, it is possible to display that the job cancelled due to the read error of the data from the HDD 114 is the cancelled job instead of the job in which the execution is not completed.

In S114, the job management module 304 controls the printing module 303 to instruct the printer unit 140 to stop the conveyance of the sheet. The printer unit 140 stops the conveyance of the sheet. In S114, the printing module 303 stops the drive of the roller on the conveyance path, such as the sheet feeding roller of the printer unit. When the printing module 303 stops the drive of each of the rollers on the conveyance path, it is possible to stop the conveyance of the sheet. Since the conveyance of the sheet is stopped as described above when the read error of the HDD 114 occurs, it is possible to avoid the situation where the sheet on which the printing is not to be normally performed due to the read error of the HDD 114 is discharged external to the MFP 100.

In addition, in S114, the printing module 303 stops the conveyance of the sheet such that none of the sheets in mid-course of the conveyance (that is, none of the sheets existing on the conveyance path at a time point when the read error of the HDD 114 is detected) are to be discharged external to the MFP 100. When the above-described configuration is adopted, it is possible to avoid the situation where the currently conveyed sheet is discharged external to the MFP 100 at the time of the occurrence of the read error from the HDD 114.

According to the present exemplary embodiment, the print job is cancelled in S113, and the conveyance of the sheet is stopped in S114. The order of S113 and S114 can be reversed. In addition, the processing in S113 and the processing in S114 can be executed in parallel.

Figure 8:
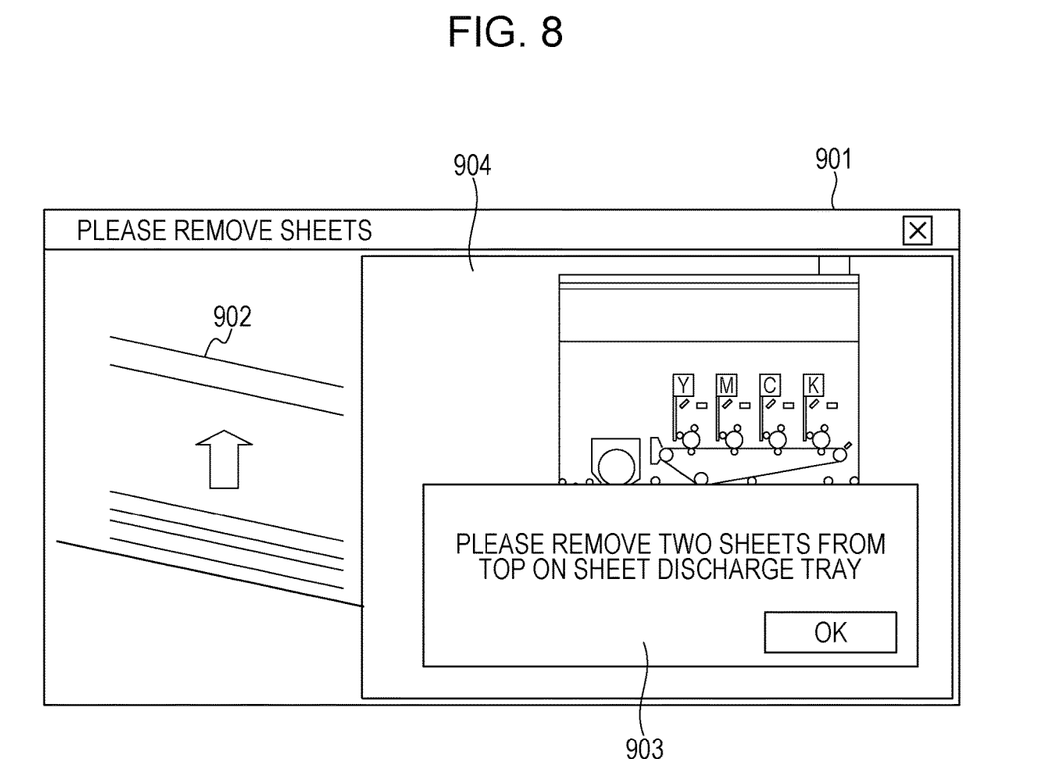
FIG. 8 is an explanatory diagram for describing an example of a screen displayed on an operation unit when a read error of an HDD according to the exemplary embodiment occurs.

In S115, the job management module 304 controls the UI control module to display a screen for notifying of the occurrence of the error on the operation unit. FIG. 8 illustrates an example of the screen displayed in S113. The screen is a screen for notifying that the sheet of the job cancelled in S111 is removed from the sheet discharge tray 515, from among the sheets discharged on the sheet discharge tray 515. When this screen is displayed, it is possible to notify the user that the sheet of the job in which the job is interrupted due to the read error of the HDD 114 and the output is only performed in mid-course is discharged on the sheet discharge tray 515. The user who has checked the screen can remove the sheet of the cancelled job from among the sheets discharged on the sheet discharge tray 515 from the sheet discharge tray 515. A message 903 is a message indicating how many sheets from among the sheets discharged on the sheet discharge tray 515 are the sheets of the cancelled job. When the user performs a tap operation on an "OK" button, the message 903 is hidden, and an area 904 is displayed. The area 904 is an area indicating that the conveyance is stopped in mid-course. A procedure for removing the sheets remaining in the MFP 100 from inside the MFP 100 is displayed in the area 904. For example, an operation for identifying a cover of the MFP 100 to be opened, an operation for identifying a method of removing the sheet from the conveyance path, an operation for closing the cover after the sheet is removed from the conveyance path, and the like are displayed in the area 904. The user performs the operations displayed in the area 904 to open the cover, remove the sheet, and close the cover. The job management module 304 receives a signal output from a cover open and close detecting sensor that indicates that the cover is closed and advances the flow to the processing described in S116.

A message indicating stopping of the conveyance of the sheet due to the occurrence of the read error of the HDD 114 or a message for calling an operator regarding a repair can also be displayed on the screen illustrated in FIG. 8. In addition, in FIG. 8, the procedure for removing the sheets from inside the MFP 100 to be displayed in the area 904 can be displayed without displaying the message 903. In addition, the message indicating stopping of the conveyance of the sheet can be displayed in the message 903.

In S116, the job management module 304 determines whether all the sheets on the conveyance path of the MFP 100 are removed. In S114, the job management module 304 obtains an output of the sensor that is configured to detect the presence or absence of the sheet and arranged in mid-course on the conveyance path. In a case where none of the sensors detects the sheet, the job management module 304 then determines that the removal of the sheets in mid-course on the conveyance path is completed. In a case where it is determined that the removal of the sheets in mid-course on the conveyance path is completed, the job management module 304 advances the processing to S115. In a case where the removal of the sheet in mid-course on the conveyance path is not completed, the job management module 304 controls the UI control module 305 and causes the operation unit to continuously display the screen indicating the procedure for removing the sheets from the conveyance path. The job management module 304 can also advance the processing to S115 based on the removal of the sheet discharged on the sheet discharge tray 515 in addition to the removal of the sheet on the conveyance path in S114.

In S117, the job management module 304 determines whether the job in which the output is not completed exists. The job in which the output is completed refers to a job in which the image formation and the sheet discharge for all the pages are completed, and the job in which the output is not completed refers to a job including a page where the sheet discharge is not completed.

In S118, the job management module 304 executes recovery processing of the job in which the output is not completed. In S118, the job management module 304 performs the setting in the RAM 112 to resume the process from the image formation based on the image data in which the conveyance of the sheet is stopped in S114 and the sheet discharge on the sheet discharge tray 515 is not performed corresponding to the job executed immediately after the cancelled job. Then, the job management module 304 controls the image generation module 302 and resumes reading of the raster image data from the position set in the RAM 112. Then, the job management module 304 returns the processing to S107.

The case where the print job received from the PC 160 is printed has been described as an example according to the present exemplary embodiment. The processing described in FIG. 8 can also be executed at the time of the printing of the image in a copy function for reading the original by the scanner unit to perform the printing and a box function for reading out the image data previously stored in the HDD 114 to perform the printing.

When the above-described processing is executed, according to the present exemplary embodiment, in a case where the read error of the HDD 114 occurs, it is possible to avoid the situation where the page on which the error has occurred is discharged external to the MFP 100. When the above-described configuration is adopted, it is possible to avoid the situation where the page on which the printing has been normally completed and the page on which the printing has not been normally completed due to the read error from the HDD 114 are mixed. According to the present exemplary embodiment, the user is instructed to remove the sheet of the job that is not executed due to the read error of the HDD 114 from the already discharged sheets. When the above-described configuration is adopted, it is possible to notify the user that there is a possibility that the sheet of the job where the printing has been normally completed and the sheet of the job where the printing has been cancelled due to the read error of the HDD 114 exist on the sheet discharge tray 515. When the user checks the above-described notification, the user can find out that the sheet of the job in which the printing has been normally completed and the sheet of the job in which the sheet discharge is only performed in mid-course exist on the sheet discharge tray 515.

Second Exemplary Embodiment

According to the first exemplary embodiment, in a case where the read error of the HDD 114 occurs, the MFP 100 performs the control in a manner that the sheet conveyance is stopped, and thereafter the sheet is not to be discharged on the sheet discharge tray 515. Then, the sheet stopped in mid-course on the conveyance path is removed, and the execution of the subsequent job is started in accordance with the closing of the cover. However, according to the first exemplary embodiment, the job subsequent to the cancelled job is not executed until the sheet remaining inside the apparatus is removed. In view of the above, according to a second exemplary embodiment, in a case where the read error of the HDD 114 occurs, the sheet of the job including the page where the read error has occurred is discharged on the sheet discharge tray 516 that is different from the sheet discharge tray 515 on which the sheet of the job in which the read error has not occurred is discharged.

Figure 9:
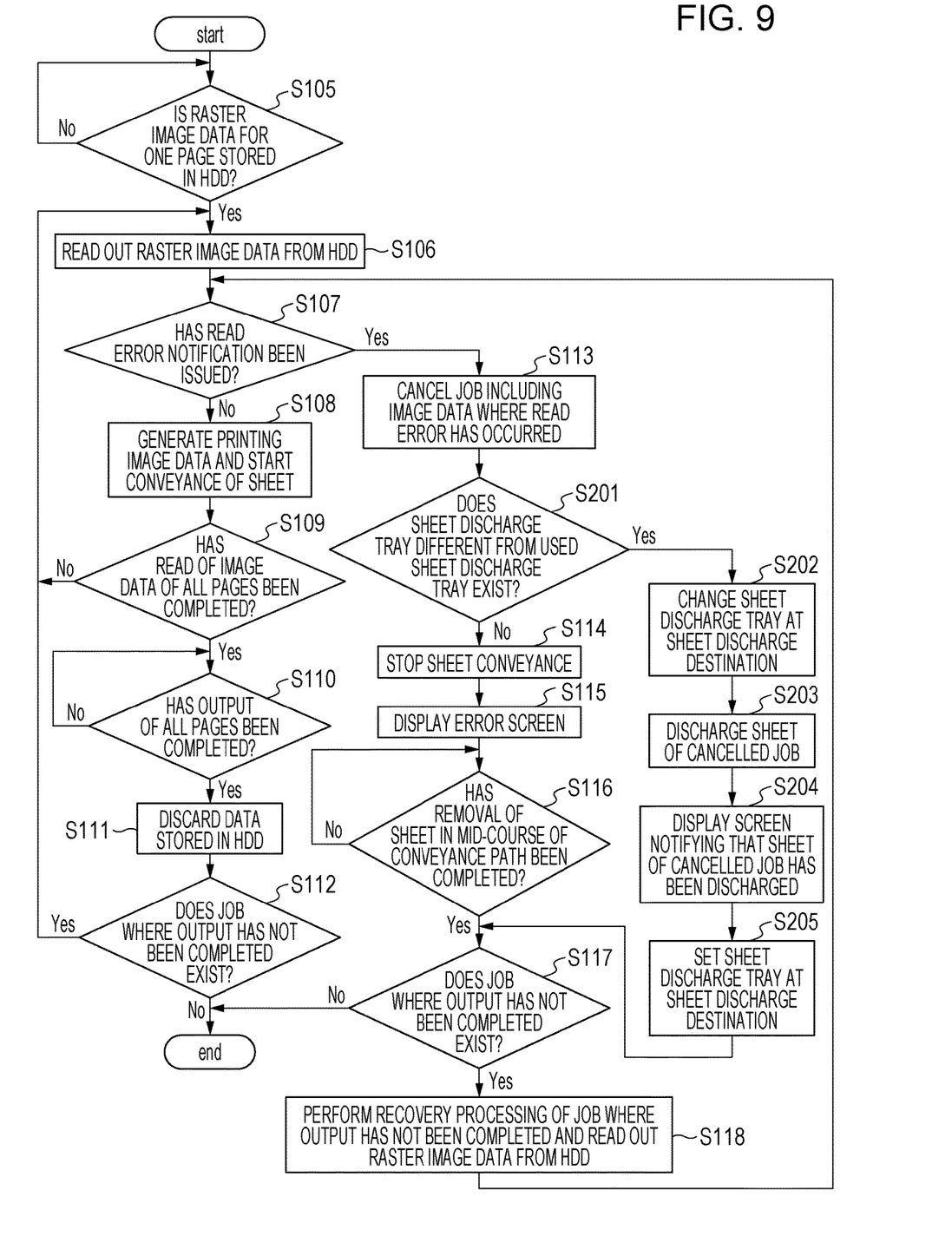
FIG. 9 is a flow chart for describing a flow of image generation processing of the image forming apparatus according to a second exemplary embodiment.

FIG. 9 is a flow chart illustrating a flow of the printing when the print job of the image forming apparatus according to the present exemplary embodiment is executed. Similar reference signs are assigned to similar processes in FIG. 8 according to the first exemplary embodiment, and descriptions thereof will be omitted.

In S201, the job management module 304 controls the printing module 303 and determines whether the sheet can be discharged on the sheet discharge tray 516 different from the currently outputting sheet discharge tray 515. In S201, the printing module 303 obtains the output of the sheet detection sensor (not illustrated) arranged on the sheet discharge tray 516 different from the sheet discharge tray 515 currently set as the sheet discharge destination. In a case where it is determined that the sheet is not discharged on the sheet discharge tray 515, the printing module 303 notifies the job management module 304 that the sheet can be discharged on the sheet discharge tray 516 that is different from the currently set sheet discharge tray 515. In a case where the printing module 303 notifies that the discharge of the sheet can be performed on the sheet discharge tray 516 that is different from the currently set sheet discharge tray 515, the job management module 304 advances the processing to S202. In a case where the sheet discharge tray 516 that is different from the sheet discharge tray 515 set as the sheet discharge destination is not usable, the job management module 304 advances the processing to S114.

In S202, the job management module 304 controls the printing module 303 and sets the discharge destination of the sheet, which is output when the job including the page where the read error has occurred is executed, as the sheet discharge tray 516 that is different from the currently set sheet discharge tray 515. In S202, the printing module 303 sets the sheet discharge tray where it is determined in S201 that the sheet can be discharged as the sheet discharge destination.

In S203, the sheet of the cancelled job is discharged on the sheet discharge tray that has been set in S202.

In S204, the job management module 304 controls the UI control module 305 and displays a screen indicating that a sheet of an abnormally ended job is discharged on the sheet discharge tray 516 that is different from the sheet discharge tray 515 set as the sheet discharge destination on the screen of the operation unit 150.

In S205, the job management module 304 controls the printing module 303 and sets the sheet discharge tray that has been set at the time of the start of the print job as the sheet discharge destination. When the above-described configuration is adopted, it is possible to avoid the situation where the sheet of the print job to be executed after the cancelled job is discharged on the same sheet discharge tray as that for the sheet discharged from the MFP 100 in the cancelling processing in S113 and the subsequent processing.

According to the second exemplary embodiment, the page where the printing is not normally completed due to the read error from the HDD 114 is discharged on the sheet discharge tray 516 different from the used sheet discharge tray 515. When the above-described configuration is adopted, it is possible to avoid the situation where the page where the printing is not normally completed due to the read error from the HDD 114 and the page where the printing has been normally completed are mixed.

Third Exemplary Embodiment

According to the first exemplary embodiment, the control is performed to stop the conveyance of the sheet at the time of the occurrence of the read error from the HDD 114 and avoid the discharge of the sheet on the sheet discharge tray 515. However, in a case where the read error from the HDD 114 occurs, the sheet on which the error page is printed is located on an upstream side close to the sheet feeding unit on the conveyance path, such as the location 606, 612, or 611 in FIG. 5. At this time, the image is normally formed on the sheet located on a downstream side on the conveyance path close to the sheet discharge tray 515 with respect to the error page. According to a third exemplary embodiment, in a case where the sheet that can be discharged exists on the downstream side of the conveyance path with respect to the error page, after the sheet located on the downstream of the conveyance path with respect to the error page is discharged, the conveyance of the sheet is stopped. When the above-described configuration is adopted, even in a case where the read error from the HDD 114 occurs, it is possible to discharge the sheet on which the printing can be normally performed. In addition, the number of remaining sheets in the MFP 100 at the time of the read error of the HDD 114 is decreased, and it is possible to reduce labor for the user to remove the sheets.

Figure 10:
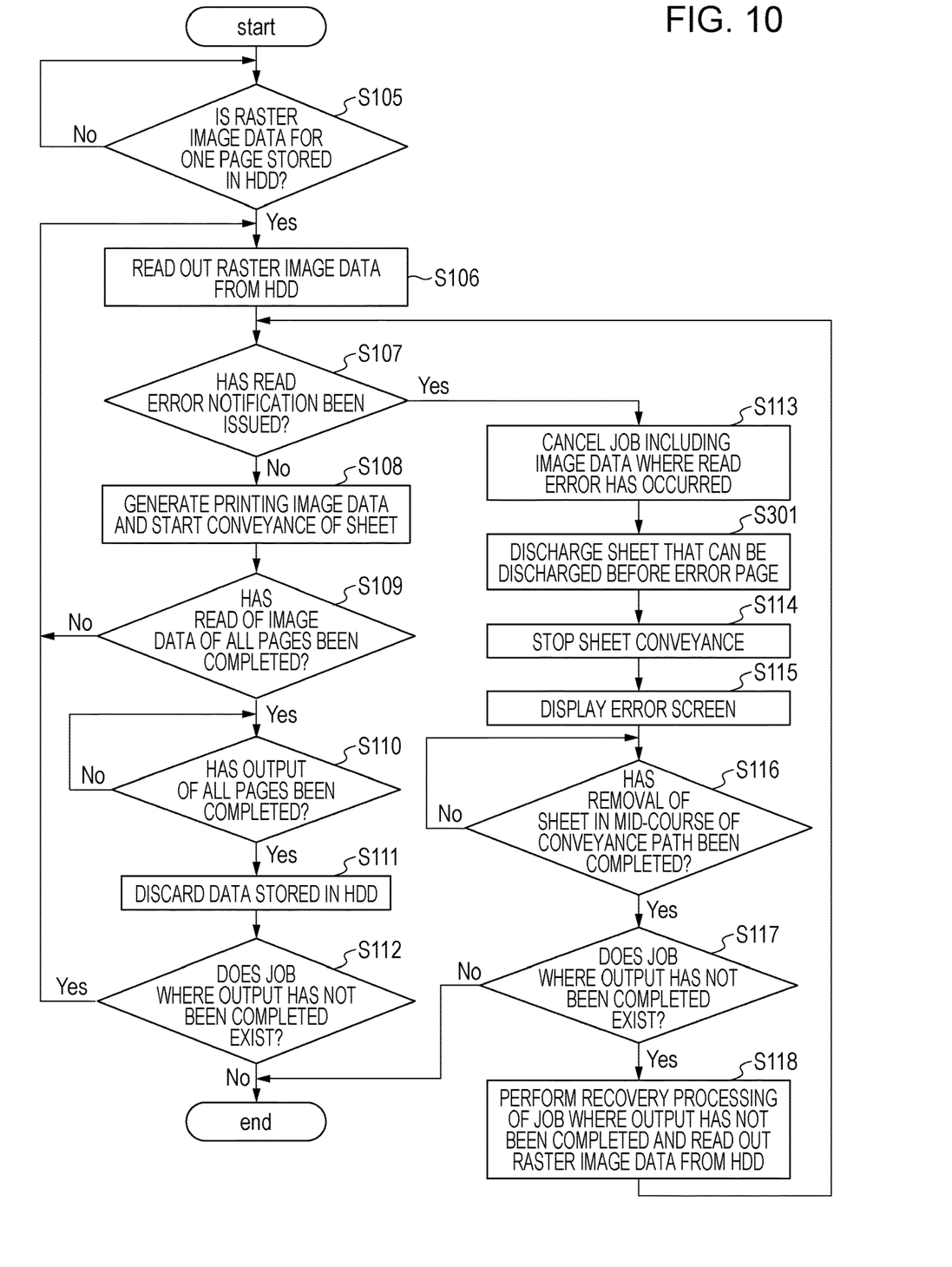
FIG. 10 is a flow chart for describing a flow of the image generation processing of the image forming apparatus according to a third exemplary embodiment.

FIG. 10 is a flow chart illustrating a flow of the printing processing when the print job of the image forming apparatus according to the present exemplary embodiment is executed. Similar reference signs are assigned to similar processes in FIG. 8 according to the first exemplary embodiment, and descriptions thereof will be omitted.

The respective processes in the present flow chart are realized when the job management module 304 stored in the ROM 113 is executed by the CPU 111.

In S301, the job management module 304 controls the printing module 303, and the sheet that can be discharged is discharged before the sheet on which the page where the read error has occurred is printed is discharged. In S301, any method can be adopted as long as a configuration is established in which the page to be output before the read page is discharged external to the MFP 100. For example, the sheet is conveyed such that a leading end of the page where the read error has occurred reaches the sensor 521 at the discharge port, and all the sheets to be discharged before the above-described sheet are discharged on the sheet discharge tray. When the above-described configuration is adopted, it is possible to avoid the situation where the sheet on which the image is not normally formed due to the occurrence of the read error is discharged from the MFP 100. It is also possible to discharge as many sheets on which the printing can be normally performed as possible external to the MFP 100.

In S301 in FIG. 10, the following processing can also be executed instead of the above-described processing. The sheet that can be discharged is discharged on the sheet discharge tray 515 without discharging the sheet on which the page where the error has occurred is printed corresponding to the sheet of the job that is different from the job including the page where the error has occurred. For example, in a case where a job A and a job B are continuously executed, it is presumed that the read error has occurred when the image data of the job B is read out from the HDD 114. At this time, it is presumed that a last page of the job A is located in the location 605 in FIG. 5, and an initial page of the job B is located in the location 610. At this time, the printing module 303 moves the initial page of the job B in the location 610 to the location 609 side corresponding to the inverse path. Then, the printing module 303 discharges the sheet in the location 605 on the sheet discharge tray 515 and stops the conveyance of the sheet.

When the above-described configuration is adopted, while the discharge of the sheet of the job including the page where the read error has occurred is avoided, the sheet of the normally executed job can be discharged on the sheet discharge tray 515.

Other Embodiments

According to the above-described embodiments, the example of the HDD 114 has been described as the location for storing the PDL data. Saving to the HDD 114 is not seen to be limiting. In another embodiment, the RAM 112 can be set as the storing location.

According to the above-described embodiments, the example has been described in which the PDL data is included as the received print job data, but this is not seen to be limiting. In another embodiment, image data such as JPEG or TIFF can be used.

According to the above-described embodiments, the example has been described in which the print job data is received from the PC as the input, but this is not seen to be limiting. In another embodiment, image data input from the scanner unit 130 in the MFP 100 can be stored in the HDD 114, and the image data can be read out from the HDD 114 to perform the printing.

According to the above-described embodiments, the ROM 113 has been described as an example of the location for storing the program, but this is not seen to be limiting. In another embodiment, the program can also be stored in the HDD 114.

According to the above-described embodiments, the MFP 100 has been described as an example of the image forming apparatus, but this is not seen to be limiting. In another embodiment, a standalone printer can be used.

The functions of the above-described embodiments can also be realized by supplying software (program) to a system or an apparatus via a network or various storage media, and a computer (such as a CPU or an MPU) of the system or the apparatus reads out program code to be executed.

Embodiments can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-109867 filed Jun. 7, 2018, which is hereby incorporated by reference herein in its entirety.

What is claimed is:

1. An image forming apparatus comprising:
a storage device configured to store image data;
a controller configured to obtain the image data from the storage device;
a printer configured to print, on a sheet and as a printed sheet, an image generated from the image data obtained by the controller from the storage device;
a conveyor configured to convey, to the printer, a sheet contained in a sheet container and convey the sheet on which the image has been formed by the printer to an outside of the image forming apparatus; and
a display configured to perform notification to a user,
wherein, based on the controller failing to obtain the image data from the storage device, the controller causes the conveyor to stop conveying the sheet, and
wherein, based on the stopping of conveying the sheet, the controller causes the display to display a screen that shows that conveying the sheet has been stopped.

2. The image forming apparatus according to claim 1, wherein, based on the controller failing to obtain the image data from the storage device, the conveyor stops conveying a sheet that is not discharged to the outside of the image forming apparatus, and
wherein the undischarged sheet corresponds to a sheet in which, before the controller fails to obtain the image data, the conveyance has been started from the sheet container.

3. The image forming apparatus according to claim 1, wherein, based on the controller failing to obtain the image data from the storage device, the conveyor stops the conveying a plurality of sheets where the conveyance has been started from the sheet container.

4. The image forming apparatus according to claim 1, wherein, based on the controller failing to obtain the image data from the storage device, the conveyor stops the conveying the sheet without discharging a currently conveyed sheet to the outside of the image forming apparatus.

5. The image forming apparatus according to claim 1, wherein the conveyor drives a roller to convey the sheet from the sheet container and stops driving the roller based on the controller failing to obtain the image data from the storage device.

6. The image forming apparatus according to claim 1, wherein the conveyor stops the conveying the sheet based on the controller failing to obtain the image data from the storage device, and stops the conveying the sheet until at least a sheet conveyed in mid-course is removed from the image forming apparatus.

7. The image forming apparatus according to claim 1, wherein the screen indicates an operation for removing the sheet where the conveyance is stopped in mid-course.

8. The image forming apparatus according to claim 1, wherein the storage device is configured to store a plurality of files including the image data, and
wherein the controller is configured to specify a file path associated with the stored image data and to read out the stored image data.

9. The image forming apparatus according to claim 1, wherein, based on the controller failing to obtain the image data from the storage device, the controller stops obtaining the image data from the storage device.

10. The image forming apparatus according to claim 1, further comprising a network interface configured to receive a print job from an external apparatus, wherein the storage device stores the print job received by the network interface.

11. The image forming apparatus according to claim 1, wherein, before the controller fails to obtained the image data, the conveyor stops conveying the sheet after discharge of the printed sheet on which the image, generated from the image data by the controller, is formed.

12. The image forming apparatus according to claim 1, wherein the storage device is a hard disc drive.

13. The image forming apparatus according to claim 1, wherein, based on the controller failing to obtain the image data from the storage device, the controller cancels a print job that includes the image data and is controlled by the controller.

14. The image forming apparatus according to claim 13, wherein the controller deletes, from the storage device, the image data that is generated based on the print job including the image data that the controller failed to obtain from the storage device.

15. The image forming apparatus according to claim 13, wherein the storage device is configured to store a plurality of print jobs, and wherein the printer prints an image generated from image data of a second print job that is different from the print job controlled by the controller so as not to be executed from among the plurality of print jobs stored in the storage device after a sheet conveyed after a sheet conveyed in mid-course is removed from the image forming apparatus.

16. The image forming apparatus according to claim 15, wherein the printer prints an image generated from image data of a third print job to be executed following the print job controlled by the controller so as not to be executed from among the plurality of print jobs stored in the storage device after the sheet conveyed in mid-course is removed from the image forming apparatus.

17. The image forming apparatus according to claim 13, wherein, based on the controller failing to obtain the image data from the storage device, the conveyor stops conveying the sheet from the sheet container.

18. The image forming apparatus according to claim 13, further comprising a network interface configured to receive a print job from an external apparatus, wherein the storage device stores the print job received by the network interface.

19. A method for an image forming apparatus, the method comprising: storing image data in a storage device;

obtaining, by a controller, the image data from the storage device;

printing, by a printer on a sheet and as a printed sheet, an image generated from the image data obtained by the controller from the storage device;

conveying, by a conveyor to the printer, a sheet contained in a sheet container and conveying the sheet on which the image has been formed by the printer to an outside of the image forming apparatus; and displaying, by a display, to perform notification to a user, wherein, based on the controller failing to obtain the image data from the storage device, conveying includes causing the conveyor to stop conveying the sheet, and wherein, based on the stopping of conveying the sheet, displaying includes displaying on the display a screen that shows that conveying the sheet has been stopped.

20. A non-transitory computer-readable storage medium storing a program to cause a computer to perform a method for an image forming apparatus, the method comprising:

storing image data in a storage device;

obtaining, by a controller, the image data from the storage device;

printing, by a printer on a sheet and as a printed sheet, an image generated from the image data obtained by the controller from the storage device;

conveying, by a conveyor to the printer, a sheet contained in a sheet container and conveying the sheet on which the image has been formed by the printer to an outside of the image forming apparatus; and displaying, by a display, to perform notification to a user, wherein, based on the controller failing to obtain the image data from the storage device, conveying includes causing the conveyor to stop conveying the sheet, and wherein, based on the stopping of conveying the sheet, displaying includes displaying on the display a screen that shows that conveying the sheet has been stopped.

* * * * *